United States Patent
Ota et al.

(10) Patent No.: US 7,428,987 B2
(45) Date of Patent: Sep. 30, 2008

(54) CASHLESS VENDING SYSTEM

(75) Inventors: Michihiro Ota, Saitama-ken (JP); Akira Onodera, Saitama-ken (JP)

(73) Assignee: Nippon Conlux Co., Ltd., Saitama-ken (JP)

( * ) Notice: Subject to any disclaimer, the term of this patent is extended or adjusted under 35 U.S.C. 154(b) by 175 days.

(21) Appl. No.: 11/372,788

(22) Filed: Mar. 10, 2006

(65) Prior Publication Data

US 2006/0217998 A1 Sep. 28, 2006

(30) Foreign Application Priority Data

Mar. 11, 2005 (JP) ............................. 2005-070124

(51) Int. Cl.
*G06F 7/08* (2006.01)
(52) U.S. Cl. ...................... 235/381; 235/380; 235/382; 235/385; 700/1
(58) Field of Classification Search ................. 235/381, 235/380, 382, 385, 492; 700/231; 340/5.9; 705/1

See application file for complete search history.

(56) References Cited

U.S. PATENT DOCUMENTS

| | | | | |
|---|---|---|---|---|
| 5,334,824 | A * | 8/1994 | Martinez | 705/41 |
| 6,913,194 | B2 * | 7/2005 | Suzuki | 235/380 |
| 2001/0034707 | A1 * | 10/2001 | Sakaguchi | 705/44 |

* cited by examiner

*Primary Examiner*—Seung H Lee
(74) *Attorney, Agent, or Firm*—Fish & Richardson P.C.

(57) ABSTRACT

There is provided a cashless vending system including a vending machine 12 having a device 16 that reads transaction history information from a medium 11 and a communication device that sends transaction history information to an information center 13; and an information center 13 having a device that receives transaction history information from the vending machine 12, a device that receives verification information from a mobile phone 14 or the like, a device that determines the validity of the verification information, and a device that sends transaction history information to the mobile phone 14 when the verification information is valid. When a user allows the vending machine to read the medium 11 and sends verification information to the information center 13 from the mobile phone 14, the information center 13 sends transaction history information to the mobile phone 14 of the user.

10 Claims, 4 Drawing Sheets

CASHLESS VENDING SYSTEM

BACKGROUND OF THE INVENTION

1. Field of the Invention

The present invention relates to a cashless vending system, and more particularly to a system in which a user accesses a transaction history of a medium such as a cashless card.

2. Description of the Related Art

A vending machine system in which a user purchases a commodity at a vending machine using a valuable medium such as a cashless card offers the user the advantage of convenience with respect to speed of purchase and relief from the complexity involved in carrying and inserting loose coins. For the installer of the vending machine there are advantages including collection of customer information, efficient money management, avoidance of cash theft, and avoidance of the risk of loss of sales opportunities due to running out of small coins for change. Although practical application of this kind of cashless vending machine system is proceeding because of these advantages, there is room for improvement with respect to means by which a user that does not possess a reader device for a transaction history that is recorded on the medium can confirm their own transaction history information. More specifically, it is necessary for a user that does not possess a medium reader device to acquire transaction history information by a method such as confirming the transaction history information that is displayed on a display of a vending machine having that function, recording the transaction history information on the medium itself, or printing out the transaction history information when purchasing a commodity.

In addition to these kinds of methods, it is possible to acquire transaction history information using infrared transmission when the user possesses a mobile device with an infrared transmission function. Further, Japanese Patent Application Laid-Open No. 2002-083322, issued on Mar. 22, 2002, discloses a system in which a user who has a cash card for transportation tickets can access transaction history information using a mobile phone. In that system, the mobile phone includes a card communication part that reads and records data through communication with a server (control center).

SUMMARY OF THE INVENTION

In a cashless vending system in which a user can buy a commodity or service with a value stored in a medium such as a card, although various methods are proposed for presenting a purchase transaction history to a user who does not possess a medium reader device, the following problems exist. First, in a method that records a transaction history on the medium itself, there is a problem that the amount of transaction history information that can be recorded is limited because the printable area is limited. Further, in a method that prints a transaction history on a separate paper instead of printing the transaction history directly on the medium, problems including the high cost of a mechanical device for printing, the fact that maintenance of the mechanical device is troublesome, and the necessity to replenish the paper supply may be mentioned. In addition, in a method that reads the transaction history information of a medium and displays it on a display device, there is a problem that the user can only check the transaction history at that location and cannot store the transaction history. Further, in a method which reads transaction history information of a medium and sends it by infrared transmission to the user's personal digital assistant with an infrared transmission function, or a method using other additional devices, there is a problem that the user must possess these additional devices. It is the object of this invention to solve the above described problems.

The above described problems can be overcome by a cashless vending machine system comprising a vending machine and information center according to the present invention. The vending machine according to the present invention includes a device that reads transaction history information and verification information from a medium; a communication device that sends transaction history information and verification information relating to the transaction history information to an information center; a device that provides the verification information to a mobile terminal; an operating device for instructing automatic sending of transaction history information; and a device that sends information representing an automatic sending instruction to an information center. The verification information may be any member of the group consisting of a password, a medium ID and a vending machine ID, or may be a combination of these.

The information center according to the present invention includes a device that receives transaction history information and verification information relating to the transaction history information that is sent from a vending machine and records these information in association with each other; a device that determines the validity of verification information received from a mobile terminal by referring to the recorded verification information; a device that sends transaction history information relating to the verification information when the validity is determined; and a device that automatically sends transaction history information in accordance with an automatic sending instruction.

In the system of the present invention, when a user wishes to confirm transaction history information that is contained in the user's own medium, the user allows a vending machine to read the medium. The vending machine reads transaction history information that is contained in the medium and verification information relating to the transaction history information and simultaneously generates a password, and sends the read transaction history information and verification information to an information center. At the same time, the vending machine provides verification information to the user. The information center associates together and stores the received transaction history information and verification information. Next, the user sends the verification information to the information center through a mobile phone. The information center checks the received verification information to determine the validity thereof. When the validity is determined, the information center sends the transaction history information to the calling mobile phone.

According to another aspect of the system of the present invention, the information center receives medium ID information and transaction history information that are sent from the vending machine, identifies mobile ID information relating to the received medium ID information based on a database, and automatically sends transaction history information to the identified mobile terminal.

It is thus possible for a user to confirm and store transaction history information displayed on a mobile phone. Accordingly, anyone can easily check and store a purchase transaction history, which enhances the convenience of the cashless vending system.

DESCRIPTION OF THE EMBODIMENTS

This invention provides a system in which a user allows a vending machine to read transaction history information of a medium such as an IC card, the vending machine sends that transaction history information to an information center, and the information center sends the transaction history information to a mobile phone or the like of the user. Although a number of specific configurations are described in this specification, these configurations are merely intended to explain the principles of the present invention. Accordingly, it will be understood that a person skilled in the art can readily devise various configurations that, although not explicitly described or shown in this specification, embody the principles of the present invention and are included in the spirit and objects of the present invention. The embodiments of the present invention are described hereunder.

Figure 1:
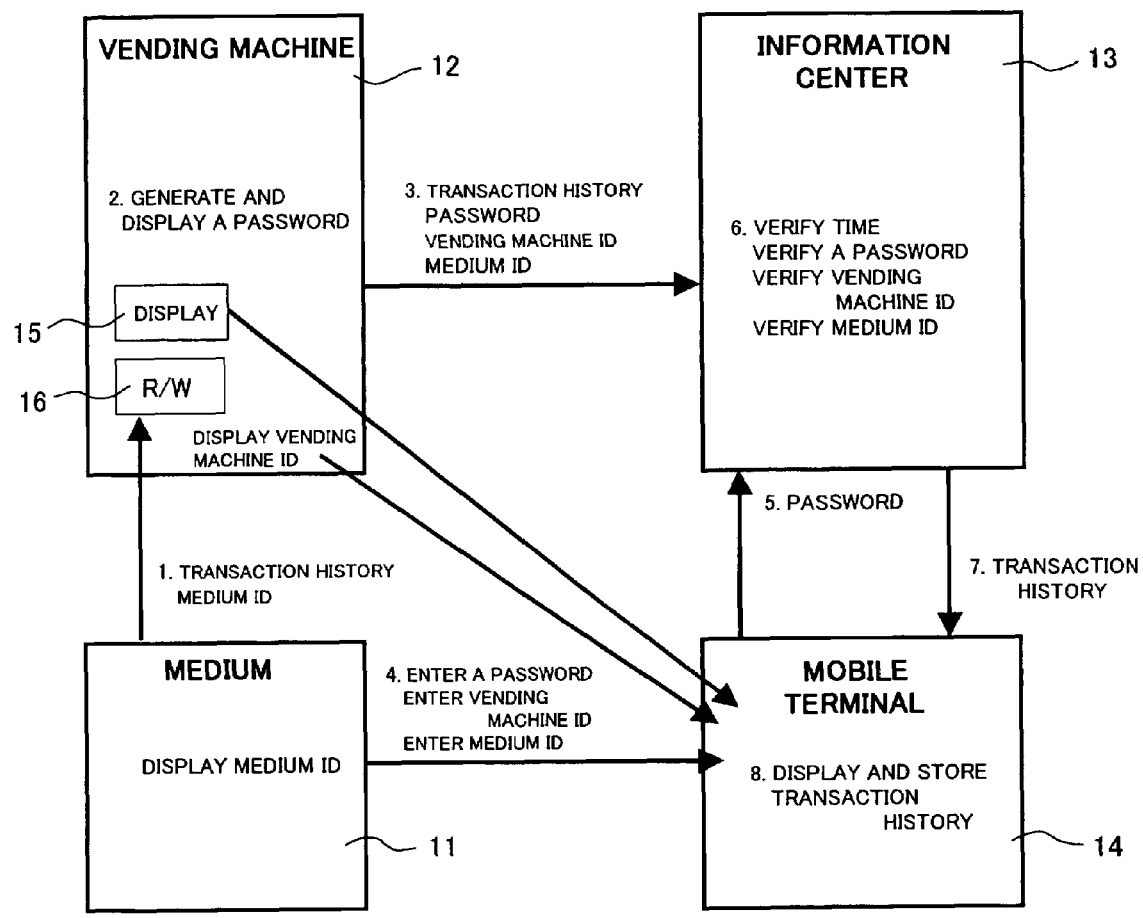
FIG. 1 is a block diagram of one embodiment of this invention.

FIG. 1 is a block diagram of one embodiment of this invention. This embodiment is composed by a medium 11 in which a certain value is stored, a vending machine 12, an information center 13 and a mobile phone 14. The medium 11 is a medium that is capable of recording certain transaction history information or the like, such as an IC card. The vending machine 12 includes a card reader writer 16 that serves as a device that reads transaction history information and medium ID information from the medium and writes a transaction history on the medium when the user purchases a commodity or service at the vending machine; a device that simultaneously generates a password upon reading information; a display unit 15 that displays the password; and a device that sends the read transaction history information, medium ID information, vending machine ID information and the password to the information center 13. The information center 13 includes a device that receives information from the vending machine 12; a device that receives verification information from the mobile phone 14; a device that determines the validity of verification information; and a device that sends transaction history information to the mobile phone 14 when the verification information is determined to be valid. In this example, the verification information may be any member of the group consisting of a password, a medium ID, and a vending machine ID, or a combination of these. The information center is a server of the vending machine installer or the like. The mobile phone 14 includes a device that sends information to the information center and receives information from the information center by, for example, electronic mail via a communications network, and stores the information.

Figure 3:
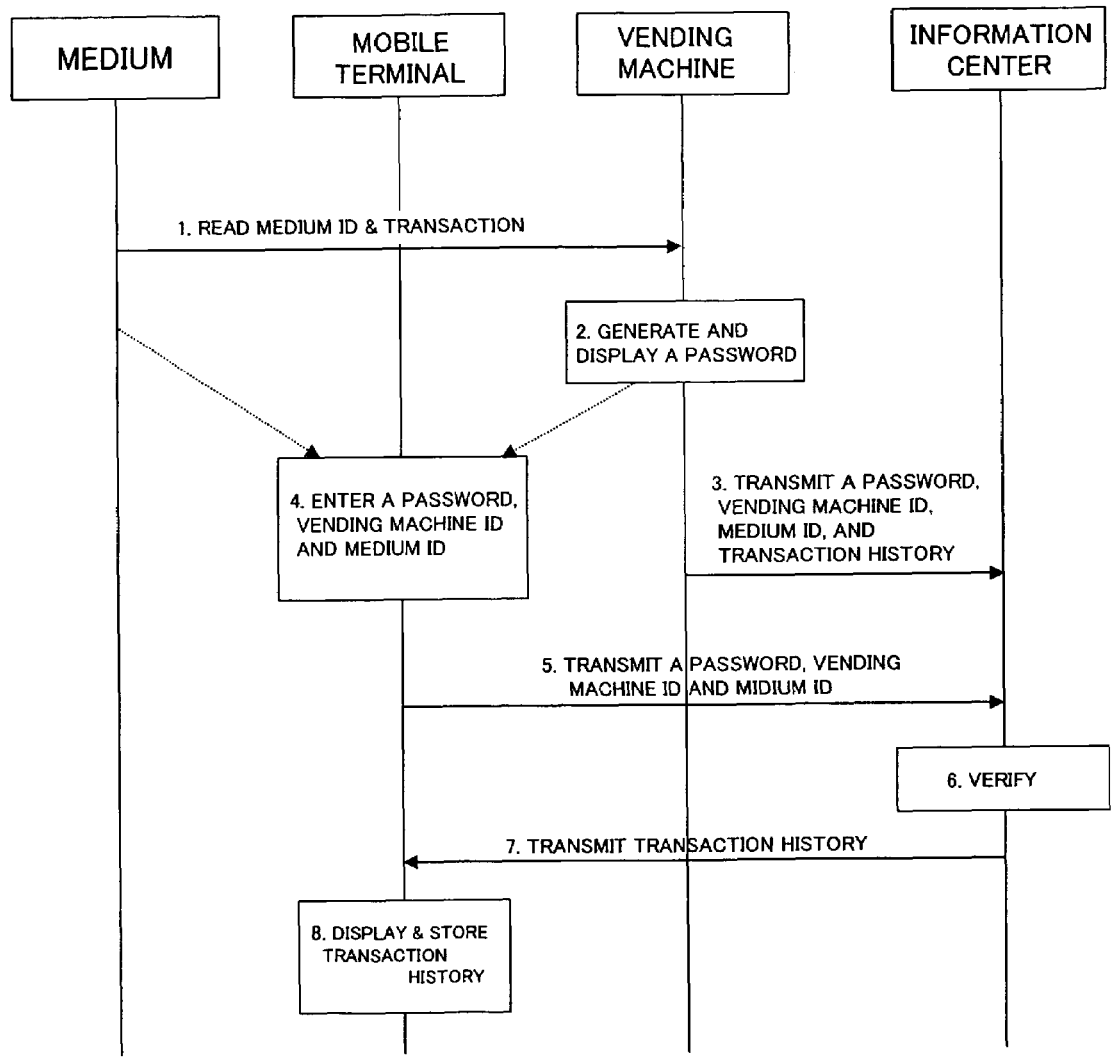
FIG. 3 is a flowchart according to the embodiment shown in FIG. 1 of this invention.

FIG. 3 is a flowchart according to the present embodiment. Hereunder, the respective operations are described specifically. First, a user allows the card reader writer 16 of the vending machine to read the medium 11. It is sufficient for the user to perform the same operation as when purchasing a commodity or service, and a special operation need not be performed.

Next, the vending machine 12 acquires transaction history information and medium ID information from the medium 11 using the card reader writer 16, and simultaneously generates a password. A password is generated at each usage occasion. Generation of a password can be performed based on the medium ID, vending machine ID or a combination of these. Other suitable methods that can identify whether or not a person attempting to access the information center 13 is an authentic user, for example, a method that generates a password with a random number generator using random numbers such as uniform random numbers or normal random numbers, can also be employed.

A password generated as described above is displayed on the display unit 15 of the vending machine 12 so as to be recognizable by the user. It is sufficient that the display unit is a device with a function that can allow a user to recognize a password.

Next, the vending machine 12 sends the medium transaction history information, and verification information comprising a password, medium ID information, and vending machine ID information that is visible to the user of the vending machine to the information center 13. At this time, no specific operation is required of the user. Although various kinds of information can be included in the transaction history information, the information includes at least the date, transaction amount, service provision zone, remaining amount, and vending machine ID information. The information that was sent is recorded at the information center 13. It is possible to prevent leakage of personal information by carrying out a suitable encryption process when sending the above described information.

Meanwhile, having recognized the password, the user enters the password together with the medium ID information and vending machine ID information into the mobile phone 14 in the user's possession. This entry may be done by key entry, similarly to when sending an email from the mobile phone 14. The entered verification information is sent from the mobile phone 14 to the information center 13 by email via a telephone connection to the information center 13 or via a data network such as the Internet.

Upon receiving the verification information from the user, the information center 13 compares the information that was sent from the vending machine 12 and the verification information that was sent from the user to determine the validity thereof. In addition to the aforementioned password, medium ID information, and vending machine ID information, the verification information according to the present embodiment also includes time information indicating whether a time difference between the time when the medium 11 was read by the vending machine 12 and the time when the information center 13 received verification information from a mobile phone or the like is within a preset standard. Accordingly, the validity of an access from a user that exceeds the relevant standard time will be denied irrespective of the validity of the other verification information.

When verification information that was sent from a user is determined as valid by the information center 13, the information center 13 sends the requested transaction history information to the mobile phone 14 of that user. By displaying the transaction history information on the mobile phone 14, the user can confirm the transaction history information and can also record the transaction history information.

Figure 2:
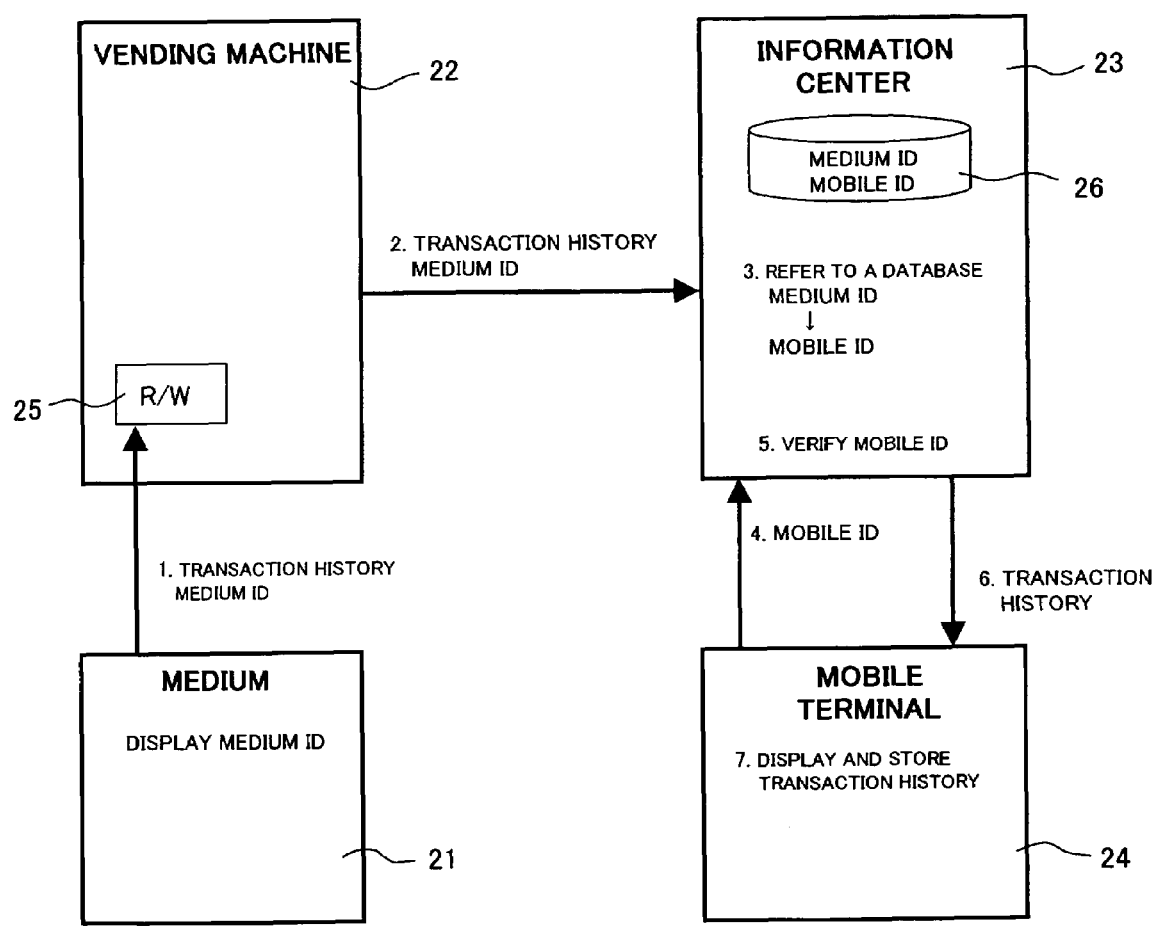
FIG. 2 is a block diagram of another embodiment of this invention.

FIG. 2 is a block diagram of another embodiment of this invention. This embodiment is composed by a medium 21 in which a certain value is stored, a vending machine 22, an information center 23, and a mobile phone 24. The medium 21 is a medium that is capable of recording certain transaction history information, such as an IC card. The vending machine 22 includes a card reader writer 25 as a device that reads transaction history information and medium ID information from the medium and writes transaction history information thereon, and a device that sends the read transaction history information and medium ID information to the information center 23. The information center 23 includes a device that receives transaction history information and verification information from the vending machine 22, a device that receives verification information from the mobile phone 24, a device that determines the validity of verification information, and a device that sends transaction history information to the mobile phone 24 when the verification information is valid. The mobile phone 24 includes a device that sends information to the information center and receives information from the information center by, for example, electronic mail via a communications network, and stores the information.

According to this embodiment, the information center 23 further includes a database 26. The database 26 has a function that associates together medium ID information and mobile phone ID information and stores the two pieces of information as a pair. Based on medium ID information received from the vending machine 22, the information center 23 can identify the mobile phone ID information that is associated with that medium ID information by referring to the database 26 in which the medium ID information and mobile phone ID information are stored in association with each other.

The medium ID information and mobile phone ID information are previously associated and stored in the database 26 in the following manner. The user sends mobile phone ID information together with medium ID information to the information center 23 from the mobile phone 24. Upon receiving this information, the information center 23 determines the validity of the medium ID information received from the user and medium ID information received from the vending machine 22. When the validity is determined, the information center 23 associates the medium ID information with the mobile phone ID information and stores the information.

Figure 4:
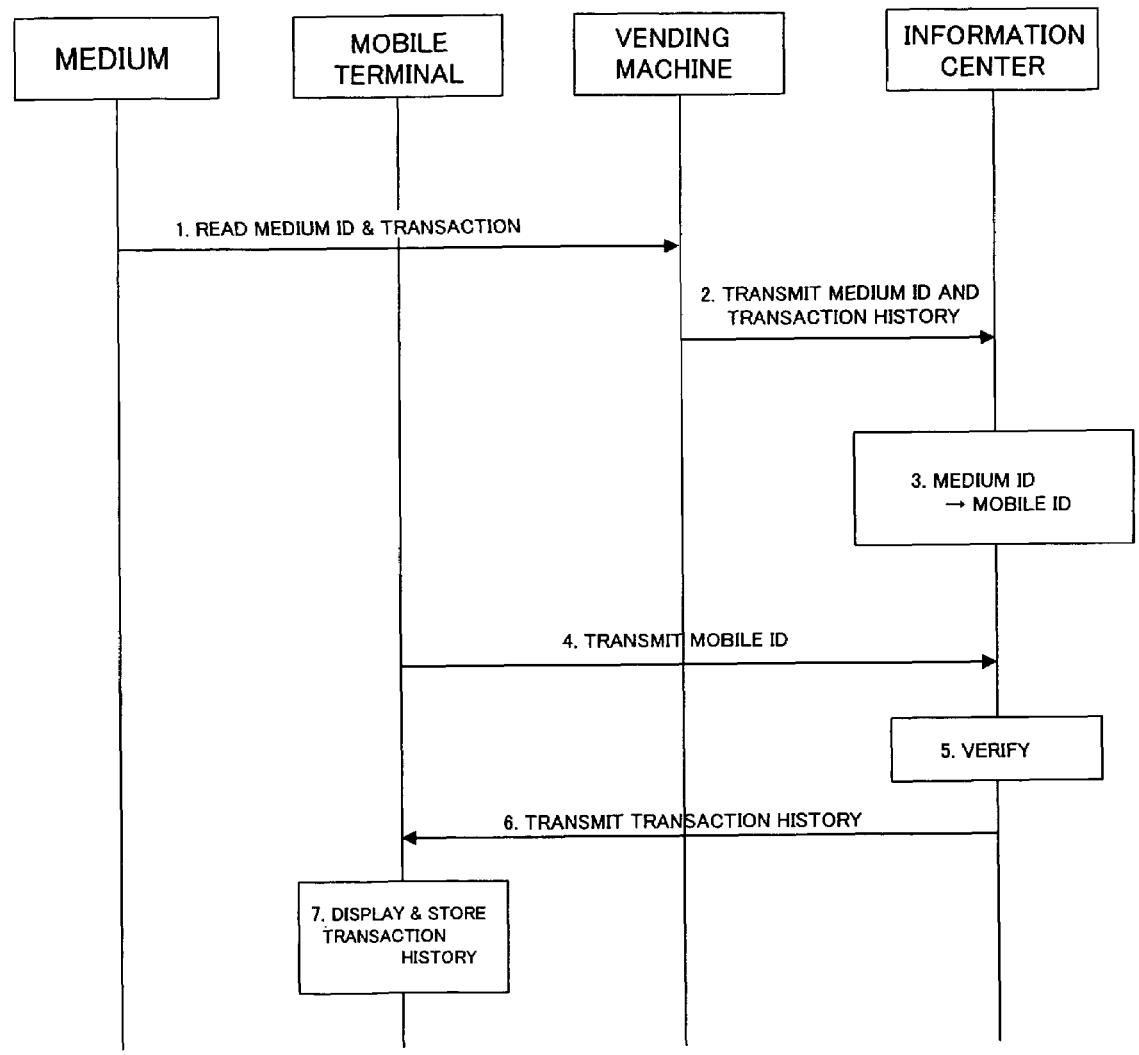
FIG. 4 is a flowchart according to the embodiment shown in FIG. 2 of this invention.

FIG. 4 is a flowchart according to the present embodiment. Hereunder, the respective operations are described specifically. First, a user allows the card reader writer 25 provided in the vending machine 22 to read the medium 21. It is sufficient for the user to perform the same operation as when purchasing a commodity or service, and a special operation need not be performed.

Next, the vending machine 22 sends the user's transaction history information and medium ID information to the information center 23. At this time, no specific operation is required of the user. Although various kinds of information can be included in the transaction history information, the information includes at least the date, transaction amount, service provision zone, remaining amount, and vending machine ID information. From the viewpoint of personal information protection, a suitable encryption process may be carried out when sending.

The information center 23 receives the information from the vending machine 22. The information center 23 then refers to the medium ID information and mobile phone ID information that are registered in association with each other in the database 26, to identify the mobile phone ID information from the received medium ID information. Meanwhile, the user sends mobile phone ID information to the information center from the mobile phone 24 that the user possesses.

Upon receiving the mobile phone ID information from the user, the information center 23 compares that mobile phone ID information with the mobile phone ID information identified based on the medium ID information received from the vending machine 22 and the information registered in the database, and thus determines the validity of the mobile phone ID information received from the user. When the mobile phone ID information received from the user is determined as valid, the information center 23 sends the transaction history information to the user.

According to a further embodiment, upon receiving the mobile phone ID information from the user, the information center 23 identifies medium ID information registered in the database on the basis of that mobile phone ID information, and based on this identification the information center 23 sends previously stored transaction history information relating to the medium ID information to the mobile phone of the user.

According to a still further embodiment, the vending machine 22 has an operating device (not shown) for instructing the automatic sending of transaction history information and the information center 23 has a device that automatically sends data in response to an automatic sending instruction. According to this embodiment, transaction history information can be automatically sent to the mobile phone 24 in response to operation of an automatic send button by a user. First, the user operates the automatic send button prior to allowing the vending machine 22 to read the medium 21. Next, the user allows the vending machine 22 to read the medium 21. The vending machine then sends the read transaction history information and medium ID information to the information center 23. Upon receiving that information, the information center 23 refers to the received medium ID in the database 26 to identify the mobile phone ID. According to this embodiment, the user is not requested to send the mobile phone ID, and the information center automatically sends transaction history information to the mobile phone that is identified by the identified mobile phone ID.

According to another embodiment, it is possible to provide a service in response to a user request, that is, when a user desires to acquire only the most recent transaction history information (for example, 20 transactions) that is recorded on the medium, or desires to acquire the most recent transaction history information (for example, 50 transactions) that is recorded at the information center. Methods for realizing this embodiment are a method using an automatic send button and a method using a mobile terminal.

In the former case, upon recognizing that the automatic send button was pressed to indicate the user's request, only the most recent transaction history information (for example, 20 transactions) that is recorded on the medium is automatically sent from the information center to the mobile terminal of the user. In contrast, when the user desires the most recent transaction history information (for example, 50 transactions) that is recorded at the information center, the user accesses the information center to acquire the transaction history information, without pressing the automatic send button.

In the latter case, the user indicates to the information center which kind of information the user desires, for example, by pressing a button on the mobile terminal when the user has accessed the information center from the mobile terminal. For example, the user can designate the most recent transaction history information that is recorded on the medium by pressing the "1" button, and can designate the most recent transaction history information that is recorded at the information center by pressing the "2" button. In response thereto, the information center sends the transaction history information, and the user receives that transaction history information.

The user can check the transaction history information that was received by the mobile phone on a mobile phone display part, and can also record the transaction history information.

What is claimed:

1. A cashless vending system in which a commodity or a service can be purchased with a value that is stored in a valuable medium, comprising a vending machine and an information center,
   wherein the vending machine comprises:
   a device for reading transaction history information and verification information relating to the transaction history information from the medium, and
   a communication device for sending the transaction history information and the verification information relating to the transaction history information to the information center;
   and wherein the information center comprises:
   a device for receiving and recording the transaction history information and the verification information relating to the transaction history information from the vending machine,
   a device for determining the validity of verification information received from a mobile terminal by referring to the recorded verification information, and
   a device for sending transaction history information relating to the verification information to the mobile terminal if the verification information received from the mobile terminal is valid;
   wherein the cashless vending system is configured such that when a user allows the vending machine to read the medium and sends the verification information to the information center from the mobile terminal, the information center sends the transaction history information to the user's mobile terminal.

2. The cashless vending system according to claim 1, wherein the device for determining the validity of the verification information determines that the verification information is valid when a difference between a time at which the vending machine reads the medium and a time at which the information center receives the verification information from the mobile terminal is shorter than a preset standard.

3. The cashless vending system according to claim 1, wherein the verification information includes password information that is generated when the vending machine reads the transaction history information from the medium, and
   the device for determining the validity of the verification information compares the password information that is received from the vending machine and the password information that is received from the mobile terminal.

4. The cashless vending system according to claim 3, wherein the information center sends password information to the mobile terminal based on a mobile ID information converted in accordance with medium ID information received from the vending machine.

5. The cashless vending system according to claim 1, wherein the verification information includes ID information that is unique to the vending machine, and
   the device for determining the validity of the verification information compares the vending machine ID information that is received from the vending machine and the vending machine ID information that is received from the mobile terminal.

6. The cashless vending system according to claim 1, wherein the verification information includes ID information that is unique to the medium, and
   the device for determining the validity of the verification information compares the medium ID information that is received from the vending machine and the medium ID information that is received from the mobile terminal.

7. The cashless vending system according to claim 1, wherein the verification information includes ID information that is unique to the mobile phone or the like, and
   the device for determining the validity of the verification information comprises a database in which the ID information that is unique to the medium and ID information that is unique to the mobile terminal are associated and stored, and
   the device for determining the validity of the verification information refers to the database to convert the ID information that is unique to the medium that is read from the medium and received from the vending machine to ID information that is unique to the mobile terminal, and compares the converted mobile ID information with the mobile ID information that is received from the mobile terminal.

8. The cashless vending system according to claim 1, wherein the vending machine comprises a device for providing the verification information relating to the transaction history information to the mobile terminal when reading the transaction history information from the medium.

9. A cashless vending system in which a commodity or a service can be purchased with a value that is stored in a medium, the system comprising a vending machine and an information center, the information center including a database for associating ID information unique to a valuable medium with ID information unique to a mobile terminal, the database storing the ID information unique to the valuable medium and the ID information to the mobile terminal
   wherein the vending machine comprises a device for reading transaction history information and medium ID information from the medium, and a sending device for sending the medium ID information and the transaction history information to the information center;
   wherein the cashless vending system is configured such that the information center receives the medium ID information and the transaction history information that are sent from the vending machine, identifies mobile ID information relating to the medium ID information that was received based on the database to compare the identified mobile ID information with mobile ID information that is sent from the mobile terminal to determine the validity thereof, and if the mobile ID information is determined as valid the information center sends the received transaction history information to the mobile terminal.

10. The cashless vending system according to claim 9, wherein the vending machine comprises an operating device for instructing automatic sending of the transaction history information; and configured, in response to a user operating the operating device, to send to the information center the medium ID information, the transaction history information and information indicating that the operating device has been operated, and based on the information indicating that the operating device has been operated, the information center automatically sends the transaction history information to the user's mobile terminal.

* * * * *